US012422870B2

(12) United States Patent
Qiu et al.

(10) Patent No.: US 12,422,870 B2
(45) Date of Patent: Sep. 23, 2025

(54) POWER SUPPLY, METHOD FOR VOLTAGE COMPENSATION AND ELECTRONIC DEVICE

(71) Applicant: General Power Microelectronics Technology Limited, Beijing (CN)

(72) Inventors: Weiming Qiu, Beijing (CN); Jinyuan Wei, Beijing (CN); Renlian Qiu, Beijing (CN); Chuming Shih, Beijing (CN)

(73) Assignee: General Power Microelectronics Technology Limited, Beijing (CN)

( * ) Notice: Subject to any disclaimer, the term of this patent is extended or adjusted under 35 U.S.C. 154(b) by 296 days.

(21) Appl. No.: 18/299,306

(22) Filed: Apr. 12, 2023

(65) Prior Publication Data

US 2024/0012436 A1 Jan. 11, 2024

(30) Foreign Application Priority Data

Jul. 6, 2022 (CN) ........................ 202210796999.X

(51) Int. Cl.
*G05F 1/46* (2006.01)

(52) U.S. Cl.
CPC .................................... *G05F 1/463* (2013.01)

(58) Field of Classification Search
CPC ....... G05F 1/463; G05F 1/567; Y10S 323/907
See application file for complete search history.

(56) References Cited

U.S. PATENT DOCUMENTS 4,668,903 A * 5/1987 Elbert ....................... G05F 3/18
323/369

FOREIGN PATENT DOCUMENTS

CN 102073334 A 5/2011
CN 104035470 A 9/2014
CN 111064438 A 4/2020
CN 111077933 A 4/2020
CN 112130615 A * 12/2020
(Continued)

OTHER PUBLICATIONS

First Office Action, including Search Report, for Chinese Patent Application No. 202210796999.X, dated Jan. 19, 2023, 8 pages.

*Primary Examiner* — Thienvu V Tran
*Assistant Examiner* — Lauren Ashley Shaw
(74) *Attorney, Agent, or Firm* — Westman, Champlin & Koehler, P.A.

(57) ABSTRACT

A power supply, method for voltage compensation and electronic device are provided. The power supply includes: a plurality of temperature compensation modules, for providing a plurality of reference voltages respectively based on a plurality of temperature curves which are not identical, and each of the temperature curve linearly characterizing a corresponding relationship between the reference voltage and temperature in a plurality of temperature ranges respectively; and a summation module, for providing an output voltage in accordance with the plurality of reference voltages, wherein for at least one temperature curve, at least two temperature ranges correspond to different temperature coefficients, so that an output voltage curve characterizing the output voltage changing with temperature has not identical temperature coefficients at least in two temperature ranges, and a critical temperature between temperature ranges in the output voltage curve corresponds to a stable output voltage.

14 Claims, 13 Drawing Sheets

(56) References Cited

FOREIGN PATENT DOCUMENTS

| | | | |
|---|---|---|---|
| CN | 113110685 | A | 7/2021 |
| CN | 114995574 | A | 9/2022 |

* cited by examiner

POWER SUPPLY, METHOD FOR VOLTAGE COMPENSATION AND ELECTRONIC DEVICE

CROSS-REFERENCE TO RELATED APPLICATION

This application claims priority to the Chinese Patent Application No. 202210796999.X, filed on Jul. 6, 2022, entitled "power supply, method for voltage compensation and electronic device", and published as CN114995574A on Sep. 2, 2022, which is incorporated herein by reference in its entirety in this disclosure.

BACKGROUND OF THE DISCLOSURE

Field of Technology

The present disclosure relates to a field of power supply technologies, and in particular, to a power supply, a method for voltage compensation and an electronic device.

Description of the Related Art

With sizes of integrated circuits continuous reducing, numbers of transistors contained in chips increasing, and processes become more and more complex, an integrated circuit industry is facing new bottlenecks and challenges. Reference power supply is an essential core module in integrated circuit design, and is widely used in analog circuits such as digital to analog converters, analog-to-digital converters, sensors, dynamic memory devices, flash memory, or mixed digital to analog circuits. The reference power supply may be divided into current reference power supply and voltage reference power supply according to its functions, and mainly provides "standard" voltage or current for other circuit structures in system. A performance of the reference power supply directly determines a stability and a quality of each index of circuit system. A most important part of power management is supplying power with stabilized voltage, especially an accuracy in extreme high temperature environment is a key to a normal operation of the system.

In order to reduce a performance fluctuation of various components in integrated circuits caused by temperature changes, an existing reference power supply is configured to provide a reference voltage that is capable of changing linearly with temperature. However, it is difficult for the reference power supply to provide accurate output voltage for different temperatures, especially for scenarios with large temperature changes. When the temperature change is larger, an error between a reference voltage provided by the reference power supply and a voltage that maintains a stability of a device is larger.

SUMMARY

In view of above problems, an objective of the present disclosure is to provide a power supply, a method for voltage compensation and an electronic device to provide an accurate output voltage under different temperature.

According to a first aspect of the present disclosure, there is provided a power supply, including:

a plurality of temperature compensation modules, for providing a plurality of reference voltages respectively based on a plurality of temperature curves which are not identical, and each of the temperature curve linearly characterizing a corresponding relationship between the reference voltage and temperature in a plurality of temperature ranges respectively; and a summation module, for providing an output voltage in accordance with the plurality of reference voltages, wherein for at least one temperature curve, at least two temperature ranges correspond to different temperature coefficients, so that an output voltage curve characterizing the output voltage changing with temperature has not identical temperature coefficients at least in two temperature ranges, and a critical temperature between temperature ranges in the output voltage curve corresponds to a stable output voltage.

Optionally, at least one of the plurality of temperature compensation modules including:

a first unit, for providing a first sub-voltage based on a first sub-temperature curve;

a second unit, for providing a second sub-voltage based on a second sub-temperature curve; and an output unit, for choosing the first sub-voltage as the reference voltage in a first temperature range and choosing the second sub-voltage as the reference voltage in a second temperature range, wherein the temperature curve includes a part of the first sub-temperature curve in the first temperature range and a part of the second sub-temperature curve in the second temperature range, a temperature coefficient of the first sub-temperature curve and a temperature coefficient of the second sub-temperature curve are different, and the first sub-temperature curve and the second sub-temperature curve intersect at the critical temperature between the first temperature range and the second temperature range.

Optionally, the summation module sums the plurality of reference voltages and a voltage reference to obtain the output voltage, wherein the output voltage has a predetermined value at a predetermined temperature by configuring a value of the voltage reference.

Optionally, the first unit and/or the second unit including:

a first current source, a first resistor and a second resistor connected in series successively between a positive voltage potential and a reference ground potential, a negative temperature coefficient current source connected between the positive voltage potential and a first parallel node, and a second current source connected between the positive voltage potential and the first parallel node, wherein a first output node is located between the first current source and the first resistor to provide a sub-temperature curve of a negative temperature coefficient; or a third current source, a third resistor and a fourth resistor connected in series successively between a positive voltage potential and a reference ground potential, a negative temperature coefficient current source connected between the reference ground potential and a second parallel node, and a fourth current source connected between the positive voltage potential and the second parallel node, wherein a second output node is located between the third current source and the third resistor to provide a sub-temperature curve of a positive temperature coefficient; or a fifth current source and a fifth resistance connected in series successively between a positive voltage potential and a reference ground potential, wherein a third output node is located between the fifth current source and the fifth resistance to provide a sub-temperature curve of a zero temperature coefficient.

According to a second aspect of the present disclosure, there is provided a method for voltage compensation, including:

providing a plurality of reference voltages respectively based on a plurality of temperature curves which are not identical, and each of the temperature curve linearly characterizing a corresponding relationship between the reference voltage and temperature in a plurality of temperature ranges respectively; and providing an output voltage in accordance with the plurality of reference voltages, wherein for at least one temperature curve, at least two temperature ranges correspond to different temperature coefficients, so that an output voltage curve characterizing the output voltage changing with temperature has not identical temperature coefficients at least in two temperature ranges, and a critical temperature between temperature ranges in the output voltage curve corresponds to a stable output voltage.

Optionally, a step of providing a plurality of reference voltages including:

providing a first sub-voltage based on a first sub-temperature curve in a first temperature range; and providing a second sub-voltage based on a second sub-temperature curve in a second temperature range; and wherein the temperature curve includes a part of the first sub-temperature curve in the first temperature range and a part of the second sub-temperature curve in the second temperature range, a temperature coefficient of the first sub-temperature curve and a temperature coefficient of the second sub-temperature curve are different, and the first sub-temperature curve and the second sub-temperature curve intersect at the critical temperature between the first temperature range and the second temperature range.

Optionally, providing the output voltage in accordance with the plurality of reference voltages including: summing the plurality of reference voltages and a voltage reference to obtain the output voltage, wherein the output voltage has a predetermined value at a predetermined temperature by configuring a value of the voltage reference.

Optionally, the first sub-temperature curve and/or the second sub-temperature curve having a negative temperature coefficient, a positive temperature coefficient or a zero temperature coefficient.

Optionally, the output voltage has a linear relationship with the temperature in each of the temperature range, and a difference between temperature coefficients of the output voltage curve in two adjacent temperature ranges is in a predetermined range.

Optionally, a temperature coefficient of the output voltage curve in each of the temperature range is a sum of temperature coefficients of the plurality of temperature curves in the temperature range.

According to a third aspect of the present disclosure, there is provided an electronic device, including the above power supply for providing the output voltage.

Optionally, further including:

a semiconductor device for operating based on the output voltage; and a regulating module for adjusting the output voltage curve of the power supply based on a temperature characteristic of the semiconductor device.

The power supply, the method for voltage compensation and the electronic device of the present disclosure acquire the output voltage by using the reference voltages with temperature curves which are not identical, so that the output voltage curve characterizing the change of the output voltage with temperature having different temperature coefficients in each temperature range, and the critical temperature between the temperature ranges in the output voltage curve corresponds to a stable output voltage. Therefore, accurate output voltage is capable of being provided in each temperature range, and no step occurs in the output voltage, which improves a stability of the output voltage.

BRIEF DESCRIPTION OF THE DRAWINGS

The above and other purposes, features and advantages of the present disclosure will be more clear through following descriptions of the embodiments of the present disclosure with reference to accompanying drawings, in which.

DETAILED DESCRIPTION OF THE DISCLOSURE

Figure 1:
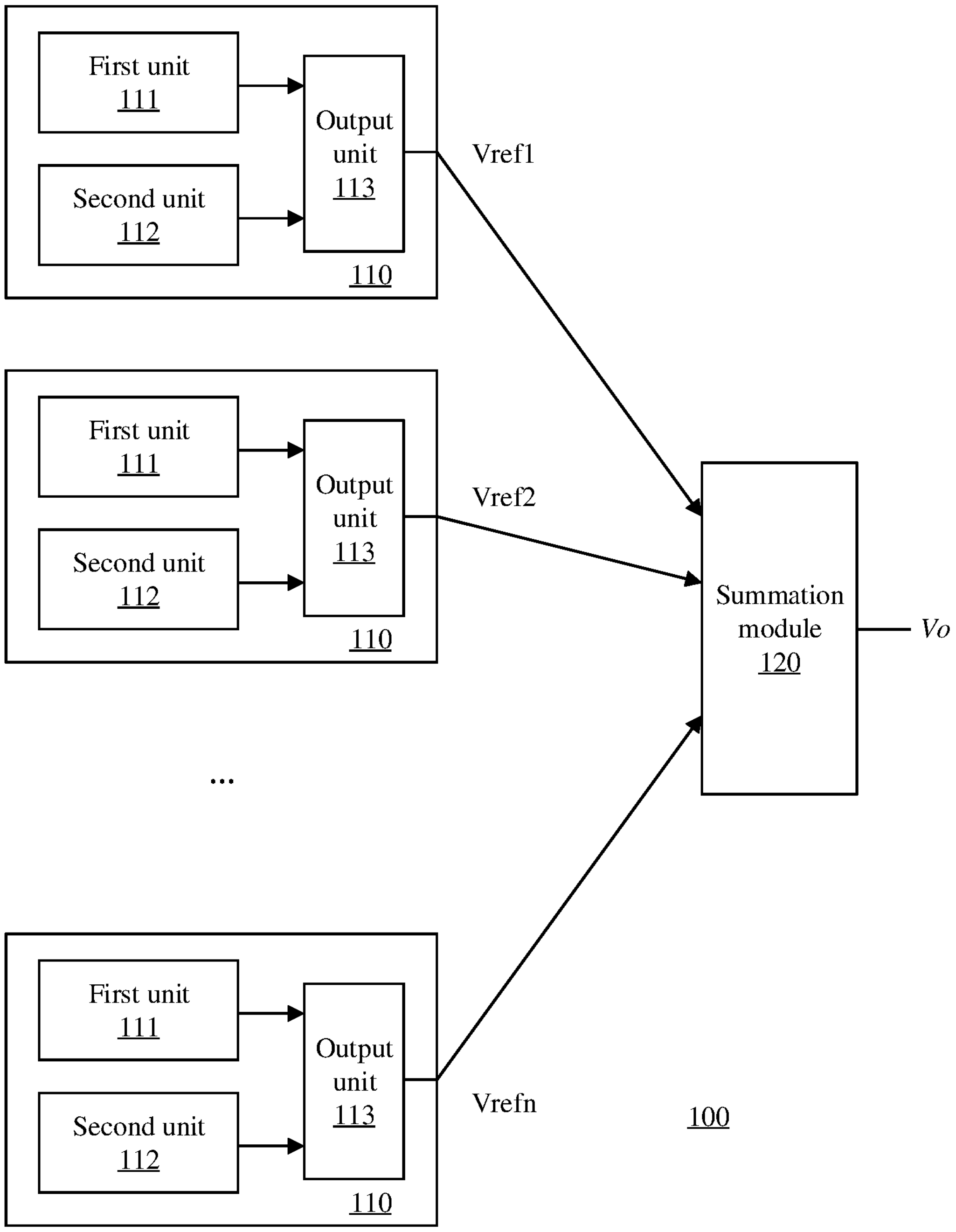
FIG. 1 shows a block diagram of a power supply according to an embodiment of the present disclosure.

The present disclosure will be described in more detail below with reference to accompanying drawings. Like elements in various drawings are denoted by like reference numerals. For purposes of clarity, various features in the drawings are not necessarily drawn to scale. In addition, certain well known components may not be shown.

In following description, numerous specific details of the present disclosure, such as structure, materials, dimensions, processes and techniques of devices are described in order to provide a more thorough understanding of the present disclosure. However, as will be understood by those skilled in field, the present disclosure may be achieved without these specific details.

It should be understood that, in the embodiments of the present disclosure, A and B are connected/coupled, which means that A and B may be connected in series or in parallel, or A and B may pass through other devices, and the embodiments of the present disclosure do not limit this.

A term "temperature curve" in the present disclosure refers to a curve of voltage changing with temperature, in the temperature curve provided by the embodiment of the present disclosure, the temperature curve is continuous, that is, no voltage step occurs. A slope of the temperature curve may be referred to as a temperature coefficient.

Embodiments of a power supply, a method for voltage compensation and a electronic device provided in the present disclosure will be described below with reference to the drawings.

Figure 2A:
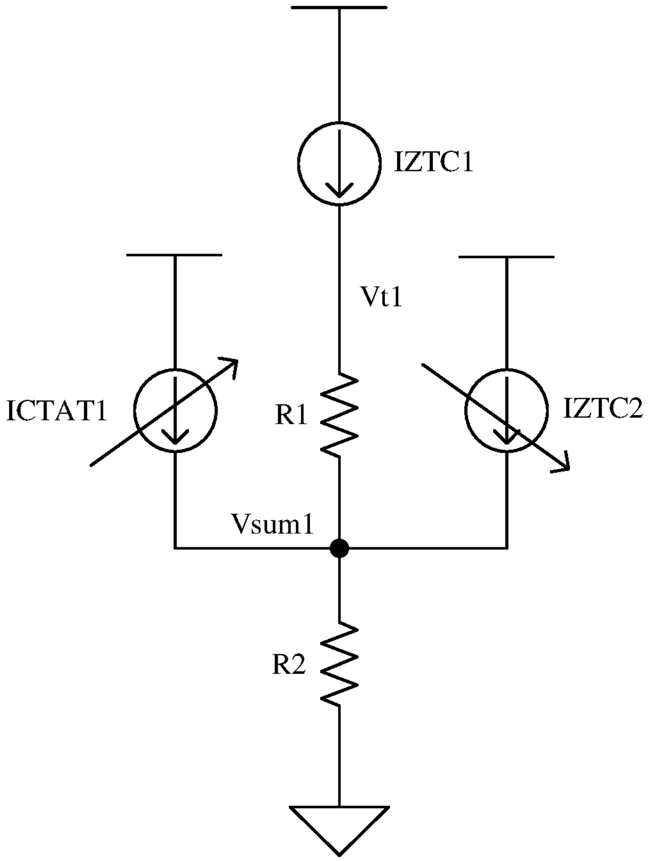
FIG. 2*a*, FIG. 2*b* and FIG. 2*c* show circuit diagrams of a first unit and a second unit in the power supply according to an embodiment of the present disclosure.
Figure 2B:
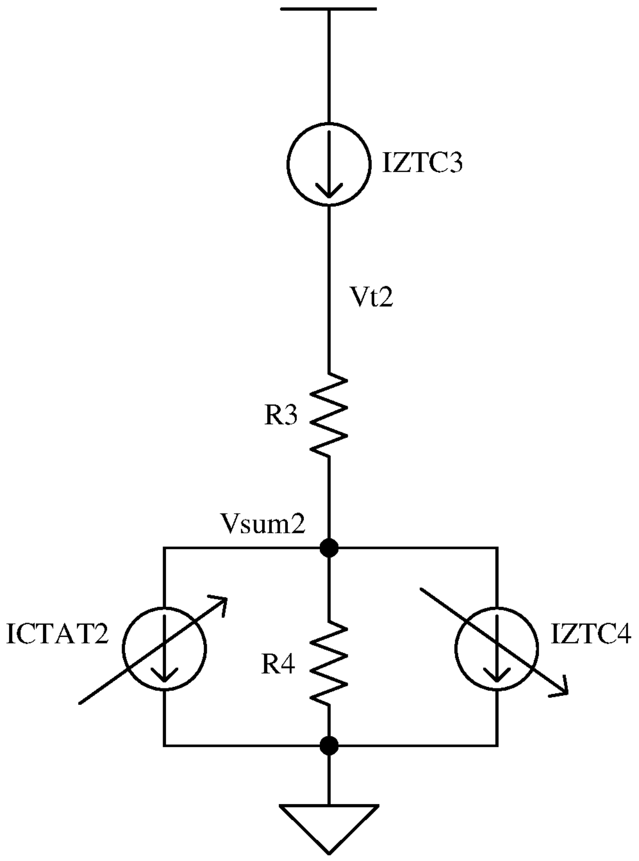
Figure 2C:
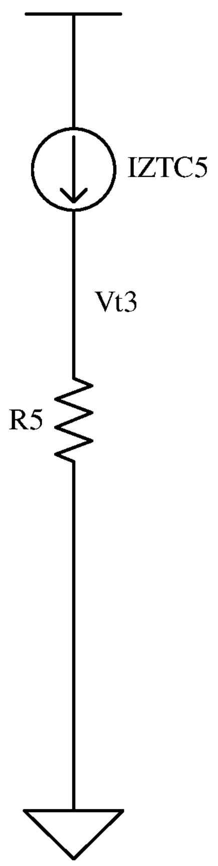
Figure 3:
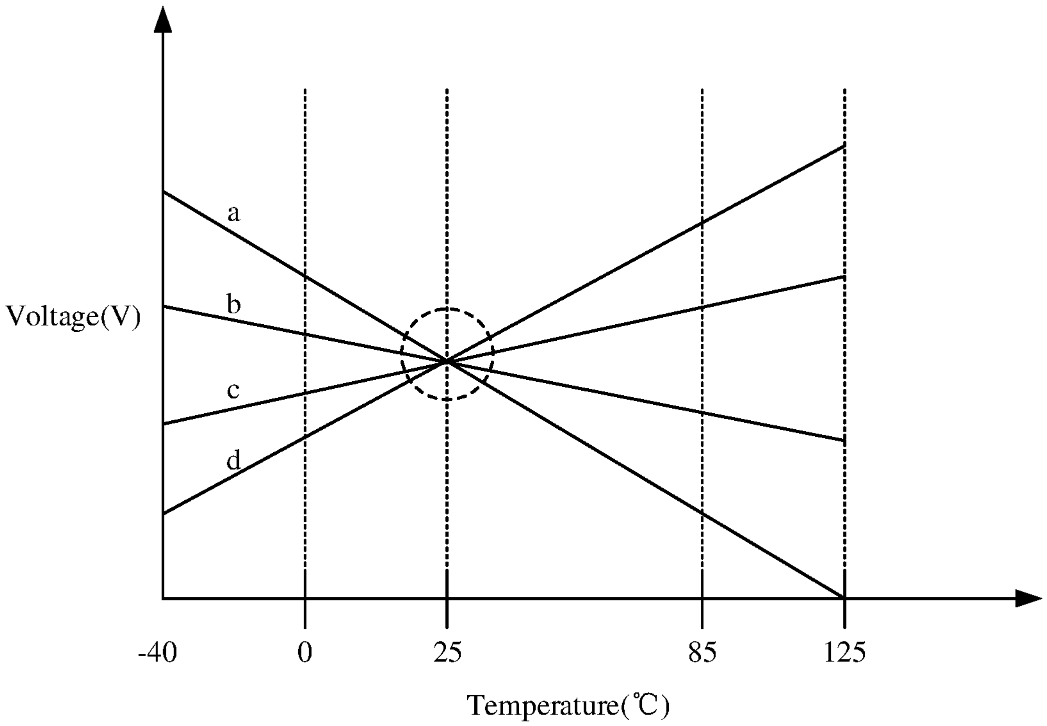
FIG. 3 shows a waveform diagram showing a first sub-voltage and a second sub-voltage provided by the first unit and the second unit of FIG. 2*a*, FIG. 2*b* and FIG. 2*c* changing with temperature.

FIG. 1 shows a block diagram of a power supply according to an embodiment of the present disclosure. FIG. 2*a*, FIG. 2*b* and FIG. 2*c* show circuit diagrams of a first unit and a second unit in the power supply according to an embodiment of the present disclosure. FIG. 3 shows a waveform diagram showing a first sub-voltage and a second sub-voltage provided by the first unit and the second unit of FIG. 2*a*, FIG. 2*b* and FIG. 2*c* changing with temperature.

As shown in FIG. 1, a power supply 100 includes a plurality of temperature compensation modules 110 and a summing module 120, and is for providing an output voltage Vo. The plurality of temperature compensation modules 110 respectively provide a plurality of reference voltages Vref1-Vrefn based on a plurality of temperature curves which are not identical, and each of the temperature curve linearly characterizing a corresponding relation between the reference voltage and temperature in a plurality of temperature ranges respectively. The summing module 120 provides the output voltage Vo based on the plurality of reference voltages Vref1-Vrefn.

For at least one temperature curve configured in the temperature compensation module 110, at least two temperature ranges correspond to different temperature coefficients, so that an output voltage curve characterizing the output voltage changing with temperature has not identical temperature coefficients at least in two temperature ranges, and a critical temperature between the temperature ranges in the output voltage curve corresponds to a stable output voltage.

In this embodiment, the temperature ranges and temperature coefficients in the output voltage curve that finally obtained may be set by setting the temperature ranges and temperature coefficients of the temperature curve configured in each temperature compensation module 110.

As an example, the temperature curves configured in each of the temperature compensation modules 110 have two temperature ranges, the temperature coefficients in two temperature ranges in at least one temperature compensation module 110 are different, and the temperature coefficients in the two temperature ranges in remaining temperature compensation modules 110 may be the same or different.

In this example, the critical temperatures between the two temperature ranges of the temperature curves configured in the temperature compensation modules 110 are not identical, for example, the critical temperature between two temperature ranges of the temperature curve configured in a first stage temperature compensation module 110 is 0° C. (Celsius degrees), the critical temperature between two temperature ranges of the temperature curve configured in a second stage temperature compensation module 110 is 25° C., the critical temperature between two temperature ranges of the temperature curve configured in a third stage temperature compensation module 110 is 45° C., and so on, and if the critical temperature between two temperature ranges of the temperature curve configured in each stage temperature compensation module 110 is different, and a number of the temperature compensation modules 110 is n, a number of the temperature ranges of the output voltage curve characterizing the output voltage changing with temperature is n+1, and the critical temperature between each temperature range corresponds to the critical temperature of each stage of the temperature compensation module 110.

In this example, the critical temperature between two temperature ranges of the temperature curves configured in each stage of the temperature compensation module 110 may be successively increased, and increasing intervals may be uniform or non-uniform. It should be understood that the temperature curves configured in each stage of the temperature compensation module 110 may be variously changed according to actual needs, and the present disclosure does not limit specific implementation manner of the temperature ranges and the temperature coefficients included in the temperature curves.

Optionally, the summing module sums the plurality of reference voltages Vref1-Vrefn and a predetermined voltage reference to obtain the output voltage Vo, configures temperature coefficients of the plurality of reference voltages Vref1-Vrefn at respective temperature regions such that the output voltage has a predetermined temperature coefficient in a predetermined temperature range, and configures a value of the voltage reference such that the output voltage has a predetermined value at a predetermined temperature.

A basic structure of each temperature compensation module 110 is similar, and a first-stage temperature compensation module 110 is taken as an example below to describe the temperature compensation module 110 in detail.

The temperature compensation module 110 includes a first unit 111, a second unit 112, and an output unit 113. The first unit 111 provides a first sub-voltage based on the first sub-temperature curve, the second unit 112 provides a second sub-voltage based on the second sub-temperature curve, and the output unit 113 chooses the first sub-voltage as the reference voltage in a first temperature range and chooses the second sub-voltage as a reference voltage in a second temperature range. In general, the temperature compensation module 110 configures a temperature curve including a part of the first sub-temperature curve in the first temperature range and a part of the second sub-temperature curve in the second temperature range, and the first sub-temperature curve and the second sub-temperature curve intersect at the critical temperature between the first temperature range and the second temperature range, and optionally, the first sub-temperature curve and the second sub-temperature curve have different temperature coefficients.

For example, referring to FIG. 3, if the first unit 111 of a certain temperature compensation module 110 provides a first sub-voltage based on a first sub-temperature curve a, the second unit 112 provides a second sub-voltage based on a second sub-temperature curve b, and a abscissa of an intersection point of the first sub-temperature curve a and the second sub-temperature curve b is 25° C., a slope of a curve of the reference voltage finally provided by the output unit 113 changing with temperature is consistent with the first sub-temperature curve a before 25° C., and is consistent with the second sub-temperature curve b after 25° C.

In some specific embodiments, the first sub-temperature curve configured in the first unit 111 and the second sub-temperature curve configured in the second unit 112 may be sub-temperature curves having positive temperature coefficients, negative temperature coefficients, or zero temperature coefficients, respectively. Referring to FIG. 2*a*-2*c*, schematic diagrams of exemplary first unit 111 and second unit 112, respectively, are shown.

As shown in FIG. 2*a*, when the first sub-temperature curve configured by the first unit 111 and/or the second sub-temperature curve configured by the second unit 112 are sub-temperature curves having negative temperature coefficients, the first unit 111 and/or the second unit 112 includes: a first current source IZTC1, a first resistor R1 and a second resistor R2 connected in series successively between a positive voltage potential and a reference ground potential, a negative temperature coefficient current source ICTAT1 connected between the positive voltage potential and a first parallel node Vsum1, and a second current source IZTC2 connected between the positive voltage potential and the first parallel node Vsum1, wherein a first output node Vt1 is located between the first current source IZTC1 and the first resistor R1 to provide the sub-temperature curve of the negative temperature coefficient.

In this embodiment, the voltage Vt1 at the first output node Vt1 is (IZTC1+IZTC2+ICTAT1)×R2+IZTC1×R1=IZTC1×(R1+R2)+(IZTC2+ICTAT1)×R2, wherein the negative temperature coefficient current source ICTAT1 and the second current source IZTC2 are, for example, adjustable current sources, and the voltage Vt1 at the first output node Vt1 is negatively correlated with the temperature after the negative temperature coefficient current source ICTAT1 and the second current source IZTC2 are configured, so that a circuit structure of the first unit 111 and/or second unit 112 shown in FIG. 2*a* is used for providing the sub-temperature curve of the negative temperature coefficient. The sub-temperature curve of the negative temperature coefficient provided by the first unit 111 and/or the second unit 112 in this embodiment may be referred to as the sub-temperature curve a and the sub-temperature curve b in FIG. 3, and it should be understood that a slope of the sub-temperature curve shown in FIG. 3 is only an example, and the slope and an intercept of the sub-temperature curve may be arbitrarily adjusted according to a practical application.

As shown in FIG. 2*b*, when the first sub-temperature curve configured by the first unit 111 and/or the second sub-temperature curve configured by the second unit 112 are sub-temperature curves having positive temperature coefficients, the first unit 111 and/or the second unit 112 includes: a third current source IZTC3, a third resistor R3 and a fourth resistor R4 connected in series successively between a positive voltage potential and a reference ground potential, a negative temperature coefficient current source ICTAT2 connected between the reference ground potential and a second parallel node Vsum2, and a fourth current source IZTC4 connected between the positive voltage potential and the second parallel node Vsum2, wherein a second output node Vt2 is located between the third current source IZTC3 and the third resistor R3 to provide the sub-temperature curve of the positive temperature coefficient.

In this embodiment, the voltage Vt2 at the second output node Vt2 is (IZTC3−IZTC4−ICTAT2)×R4+IZTC3×R3=IZTC3×(R3+R4)−(IZTC4+ICTAT2)×R4, wherein the negative temperature coefficient current source ICTAT2 and the fourth current source IZTC4 are, for example, adjustable current sources, and the voltage Vt1 at the first output node Vt2 is positively correlated with the temperature after the negative temperature coefficient current source ICTAT2 and the fourth current source IZTC4 are configured, so that a circuit structure of the first unit 111 and/or second unit 112 shown in FIG. 2*b* is used for providing the sub-temperature curve of the positive temperature coefficient. The sub-temperature curve of the positive temperature coefficient provided by the first unit 111 and/or the second unit 112 in this embodiment may be referred to as a sub-temperature curve c and a sub-temperature curve d in FIG. 3, and it should be understood that a slope of the sub-temperature curve shown in FIG. 3 is only an example, and the slope and an intercept of the sub-temperature curve can be arbitrarily adjusted according to a practical application.

As shown in FIG. 2*c*, when the first sub-temperature curve configured by the first unit 111 and/or the second sub-temperature curve configured by the second unit 112 are sub-temperature curves having the zero temperature coefficient, the first unit 111 and/or the second unit 112 includes: a fifth current source IZTC5 and a fifth resistor R5 connected in series successively between a positive voltage potential and a reference ground potential, wherein a third output node is located between the fifth current source IZTC5 and the fifth resistor R5, and a voltage Vt3 at the third output node Vt3 is used to provide a sub-temperature curve of the zero temperature coefficient.

The present disclosure also provides an electronic device including the power supply as shown in FIG. 1 for providing the output voltage Vo. Optionally, the electronic device further includes: a semiconductor device for operating based on the output voltage; and an adjusting module for adjusting the output voltage curve of the power supply based on a temperature characteristic of the semiconductor device. The temperature characteristic of the semiconductor device may refer to a change in a current allowed to pass or a voltage received in the semiconductor device at different temperatures, and the temperature characteristic of the semiconductor device may change in different temperature ranges. The output voltage Vo provided in the electronic device has corresponding temperature coefficients in each predetermined temperature range, and the adjusting module is capable of adjusting the output voltage of the power supply according to the temperature characteristic of the semiconductor device, so that the semiconductor device achieves good performance at any temperature, and a working capacity of the electronic device under various temperature conditions is improved.

Some examples of the power supply and the electronic device of the embodiment of the present disclosure are described above, however, the embodiment of the present disclosure is not limited thereto, and there may be other extensions and modifications.

For example, it should be understood that the reference ground potential in the foregoing embodiments may be replaced in alternative embodiments with other non-zero reference potentials (having positive or negative voltage magnitudes) or with controlled varying reference signals.

For another example, the electronic device may be a discrete device, may also be a circuit unit, and may also be combined into a high-efficiency high-linearity broadband power amplifier module. In other implementations, the power supply aforementioned may be packaged in a device, and the semiconductor device may serve as a load structure around the device.

Also, those of ordinary skill in the art will recognize that the various example structures and methods described in connection with the embodiments disclosed herein can be implemented using various configurations or adjustments, with each structure or reasonable variations of the structure, but such implementations should not be considered as beyond the scope of the present disclosure. Furthermore, it should be understood that the connection relationship between the components of the amplifier in the foregoing figures in the embodiments of the present disclosure is an illustrative example, and does not set any limit to the embodiments of the present disclosure.

Figure 4:
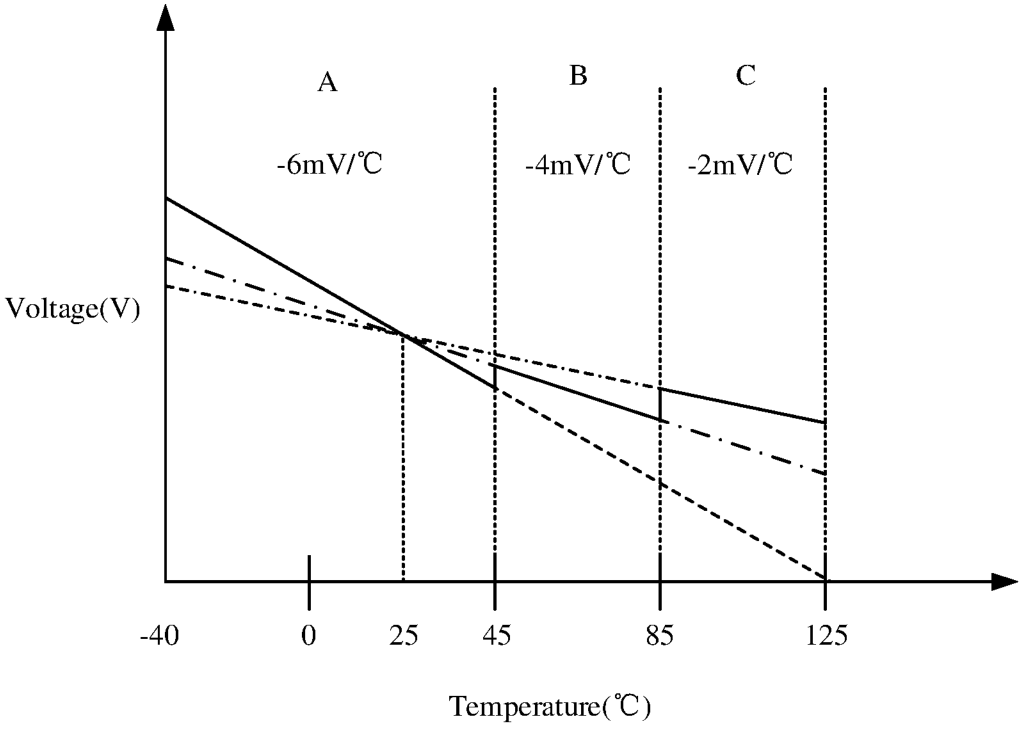
FIG. 4 shows a waveform of a reference voltage provided by a traditional power supply changing with temperature.

FIG. 4 shows a waveform of a reference voltage provided by a traditional power supply changing with temperature. As shown in FIG. 4, in the conventional power supply, even though the power supply may provide temperature curves with different slopes characterizing output voltages changing with temperature, in order to ensure that the output voltage has a predetermined value at a predetermined temperature (for example, a predetermined value at 25° C.), original temperature curves need to intersect at a same point, so that when the temperature curves with different slopes are selected in different temperature ranges, a voltage corresponding to a critical temperature between the temperature ranges is stepped, and at these critical temperatures, the output voltage has instability, which is not favorable for the normal operation of the circuit.

Figure 5:
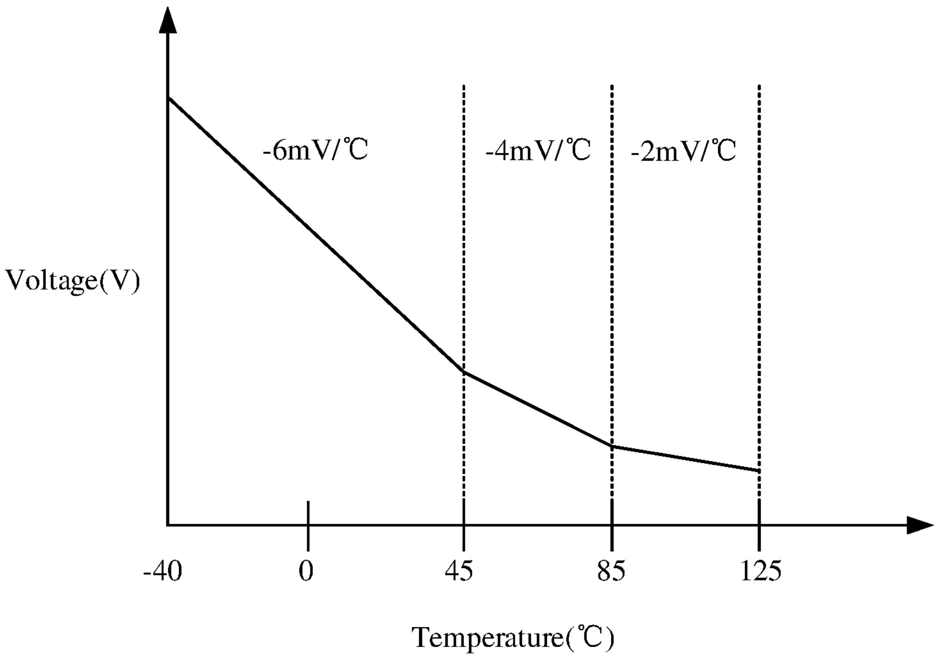
FIG. 5 shows a waveform diagram of an output voltage changing with temperature according to a first embodiment of the present disclosure.

Based on an exemplary configuration, FIG. 5 shows a waveform diagram of an output voltage changing with temperature according to a first embodiment of the present disclosure. The output voltage curve of the output voltage provided by the power supply shown in FIG. 1 changing with temperature is shown in FIG. 5, the output voltage curve is divided into three temperature ranges, and in the first temperature range of −40-45° C., the temperature coefficient is −6 mV/° C., that is, the output voltage is reduced by 6 mV when the temperature is increased by 1° C.; in a second temperature range of 45-85° C., the temperature coefficient is −4 mV/° C., that is, the output voltage is reduced by 4 mV when the temperature is increased by 1° C.; in a third temperature range of 85-125° C., the temperature coefficient is −5 mV/° C., that is, the output voltage is reduced by 5 mV when the temperature rises by 1° C. It should be understood that the output voltage curve shown in FIG. 5 is only an example, and it does not limit the specific parameters such as temperature range, temperature range, temperature coefficient, voltage value, etc. applicable to the power supply provided in the present disclosure.

Compared with the output voltage curve of the conventional power supply shown in FIG. 4, the output voltage curve of the power supply shown in FIG. 5 provided by the present disclosure is continuous among various temperature ranges, and particularly, the critical temperature between the temperature ranges corresponds to a stable voltage, so that a condition of voltage step cannot occur, and a stability of the output voltage is greatly improved.

Figure 6:
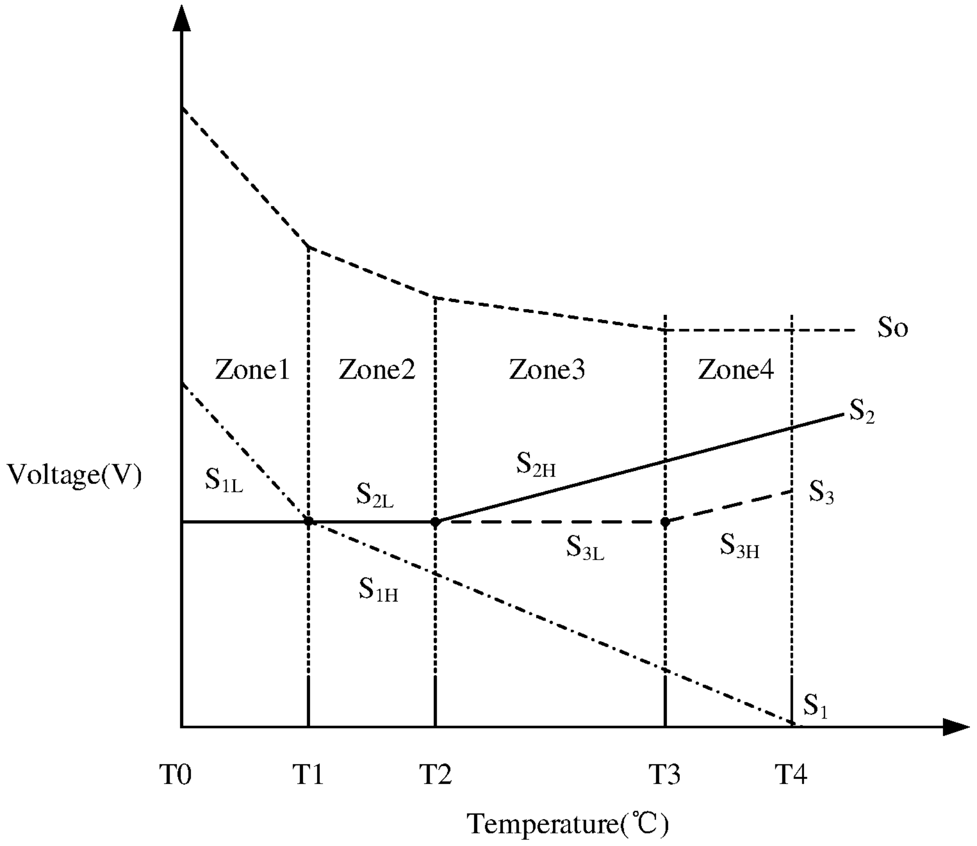
FIG. 6 shows a waveform diagram of an output voltage changing with temperature according to a second embodiment of the present disclosure.

Based on another exemplary configuration, FIG. 6 shows a waveform diagram of an output voltage changing with temperature according to a second embodiment of the present disclosure, and how an output voltage curve of the present disclosure is specifically obtained may be explained with reference to FIG. 6. As shown in FIG. 6, an output voltage curve characterizing the output voltage provided by the power supply changing with temperature is divided into four temperature ranges Zone1, Zone2, Zone3 and Zone4, and the output voltage curve So is obtained according to temperature curves S1, S2 and S3 of three reference voltages, temperature curves S1, S2 and S3 of the reference voltages are obtained respectively according to sub-temperature curves $S_{1L}$, $S_{1x}$, $S_{2L}$, $S_{2H}$, $S_{3L}$, and $S_{3H}$.

Specifically, the temperature curve S1 of the reference voltage includes a prat of temperature curve $S_{1L}$ in the temperature range Zone1 and a prat of temperature curve $S_{1x}$ in the temperature ranges Zone2, Zone3 and Zone4, that is, the temperature curve S1 has different temperature coefficients in the temperature ranges Zone1 and the temperature ranges Zone2, Zone3 and Zone4; the temperature curve S2 of the reference voltage includes a prat of temperature curve $S_{2L}$ in the temperature ranges Zone1 and Zone2 and a prat of temperature curve $S_{2H}$ in the temperature ranges Zone3 and Zone4, that is, the temperature curve S2 has different temperature coefficients in the temperature ranges Zone1 and Zone2 and the temperature ranges Zone3 and Zone4; the temperature curve S3 of the reference voltage includes a prat of temperature curve $S_{3L}$ in the temperature ranges Zone1, Zone2 and Zone3 and a prat of temperature curve $S_{3H}$ in the temperature range Zone4, that is, the temperature curve S3 has different temperature coefficients in the temperature ranges Zone1, Zone2 and Zone3 and the temperature range Zone4.

Then, the temperature curve $S_1$, $S_2$ and $S_3$ are combined to obtain the output voltage curve Vo of the power supply. Due to the temperature curve $S_1$, $S_2$ and $S_3$ in each temperature range is continuous, the output voltage curve Vo is also continuous in each temperature range, and the temperature coefficient of the output voltage curve Vo in each temperature range may be determined by configuring the temperature coefficients of the temperature curve $S_1$, $S_2$ and $S_3$ in the respective temperature ranges.

Figure 7:
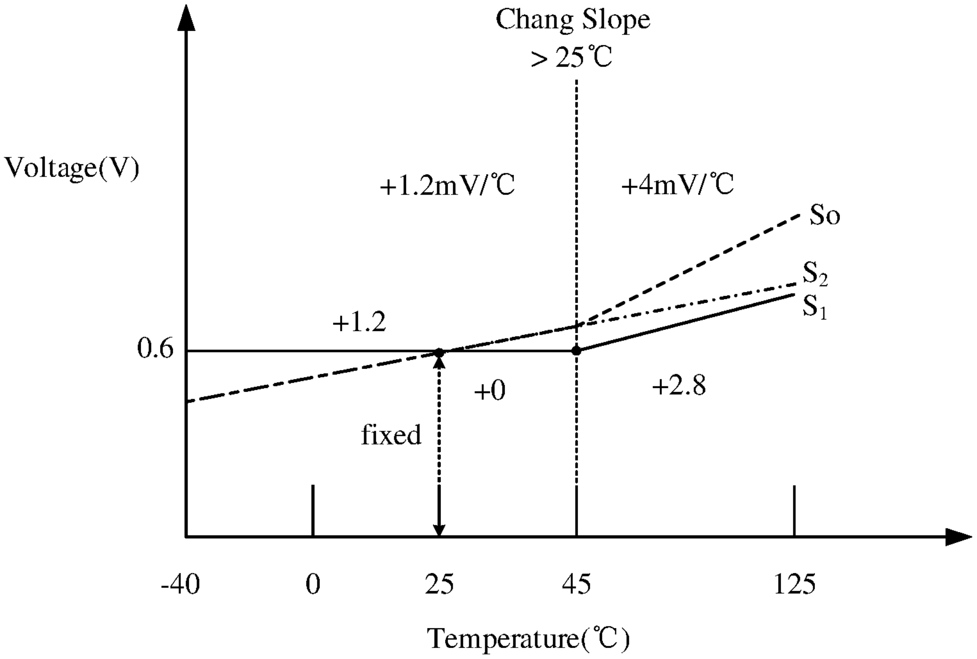
FIG. 7 shows a waveform diagram of an output voltage changing with temperature according to a third embodiment of the present disclosure.

Based on another exemplary configuration, FIG. 7 shows a waveform diagram of an output voltage changing with temperature according to a third embodiment of the present disclosure. As shown in FIG. 7, the output voltage curve characterizing the output voltage provided by the power supply changing with temperature is divided into two temperature ranges, and the output voltage curve So is obtained according to temperature curves $S_1$ and $S_2$ of two reference voltages. In this embodiment, a temperature coefficient of the temperature curve $S_1$ is 0 mV/° C. in a temperature range of −40 to 45° C., and the temperature coefficient is 2.8 mV/° C. in a temperature range of 45 to 125° C.; a temperature coefficient of the temperature curve $S_2$ is 1.2 mV/° C. in a temperature range of −40 to 125° C.; therefore, a temperature coefficient of the output voltage curve So is 1.2 mV/° C. in a temperature range of −40 to 45° C. and 4 mV/° C. in a temperature range of 45 to 125° C. Further, in order to obtain an output voltage with a predetermined value at a temperature of 25° C., the summing module in the power supply also performs voltage offset on the output voltage curve, for example, adds a negative voltage value after summing the reference voltages, so as to obtain an output voltage with a predetermined value at a predetermined temperature.

Figure 8:
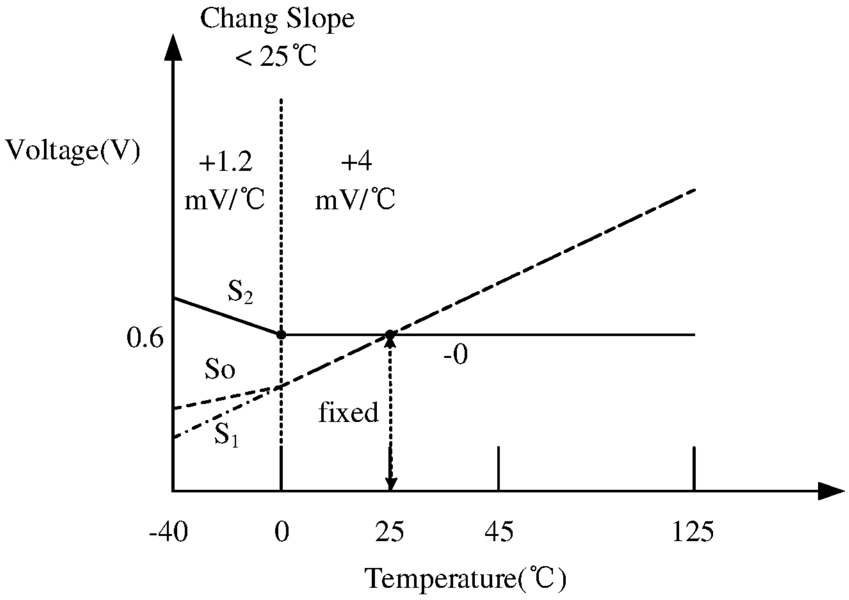
FIG. 8 shows a waveform diagram of an output voltage changing with temperature according to a forth embodiment of the present disclosure.

Based on another exemplary configuration, FIG. 8 shows a waveform diagram of an output voltage changing with temperature according to a forth embodiment of the present disclosure. As shown in FIG. 8, the output voltage curve characterizing the output voltage provided by the power supply changing with temperature is divided into two temperature ranges, and the output voltage curve So is obtained according to temperature curves $S_1$ and $S_2$ of two reference voltages. In this embodiment, a temperature coefficient of the temperature curve $S_1$ is 4 mV/° C. in a temperature range of −40 to 125° C.; a temperature coefficient of the temperature curve $S_2$ is −2.8 mV/° C. in a temperature range of −40 to 0° C., and the temperature coefficient is 0 mV/° C. in a temperature range of 0 to 125° C.; therefore, a temperature coefficient of the output voltage curve So is 1.2 mV/° C. in a temperature range of −40 to 0° C. and 4 mV/° C. in a temperature range of 0 to 125° C. Further, in order to obtain an output voltage with a predetermined value at a temperature of 25° C., the summing module in the power supply also performs voltage offset on the output voltage curve, for example, after summing the reference voltages, a negative voltage value is added to obtain an output voltage with a predetermined value at a predetermined temperature.

As may be seen from the embodiments shown in FIG. 7 and FIG. 8, regardless of the temperature range of the output voltage curve and the temperature coefficient in the temperature range, the output voltage curve is capable of being configured to obtain an output voltage having a predetermined value at a predetermined temperature by performing a voltage offset.

Figure 9:
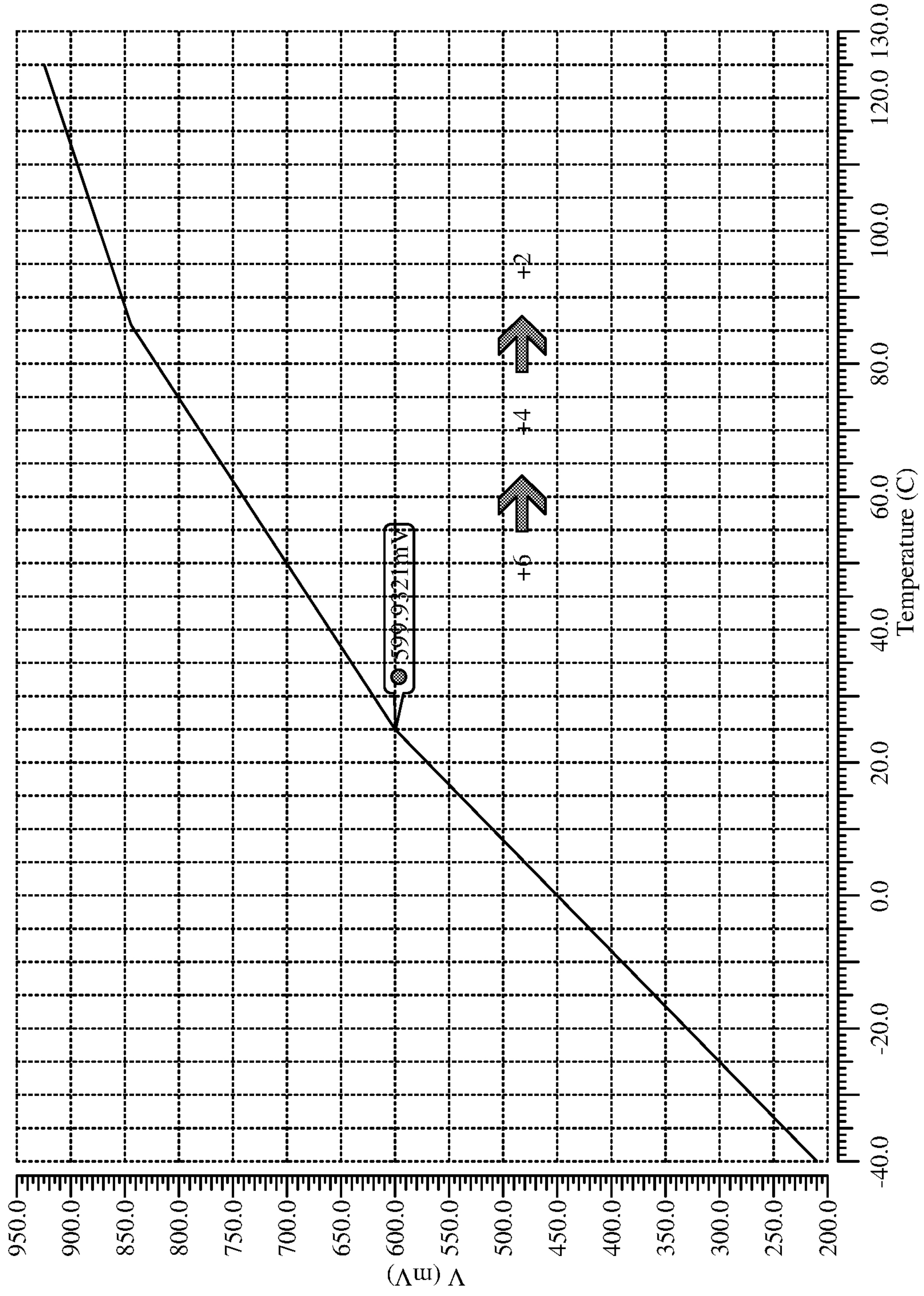
FIG. 9 shows a simulation waveform diagram of an output voltage changing with temperature according to a first embodiment of the present disclosure.
Figure 10:
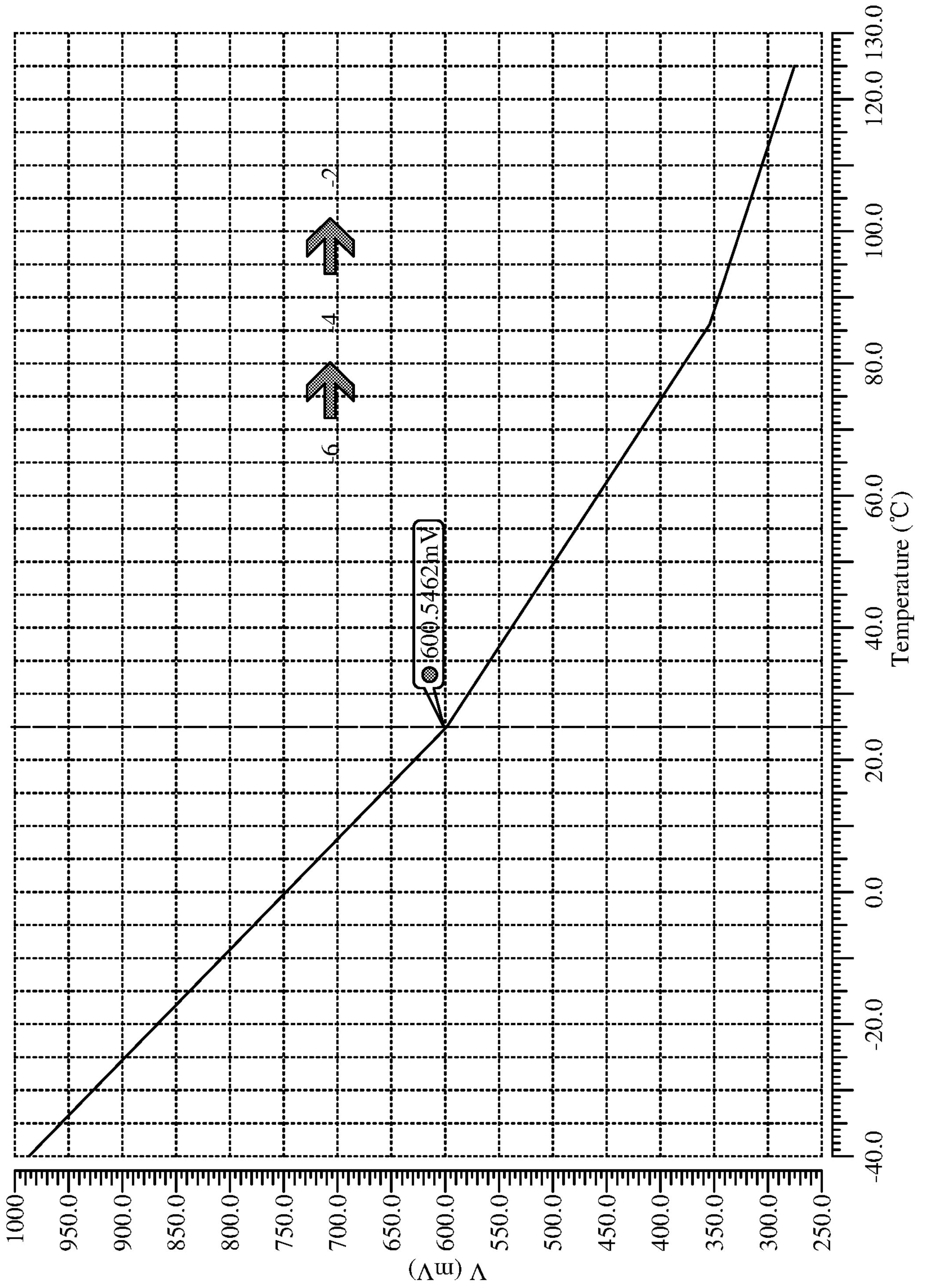
FIG. 10 shows a simulation waveform of an output voltage changing with temperature according to a second embodiment of the present disclosure.

FIG. 9 shows a simulation waveform diagram of an output voltage changing with temperature according to a first embodiment of the present disclosure. FIG. 10 shows a simulation waveform of an output voltage changing with temperature according to a second embodiment of the present disclosure.

As shown in FIG. 9, the output voltage curve So has a temperature coefficient of 6 mV/° C. in a temperature range of −40 to 25° C., a temperature coefficient of 4 mV/° C. in a temperature range of 25 to 85° C., a temperature coefficient of 2 mV/° C. in a temperature range of 85 to 125° C., and a predetermined voltage value of 600 mV at 25° C.

As shown in FIG. 10, the output voltage curve So has a temperature coefficient of −6 mV/° C. in a temperature range of −40 to 25° C., a temperature coefficient of −4 mV/° C. in a temperature range of 25 to 85° C., a temperature coefficient of −2 mV/° C. in a temperature range of 85 to 125° C., and a predetermined voltage value of 600 mV at 25° C.

As may be seen from FIG. 9 and FIG. 10, in practical applications, the output voltage curve of the power supply provided by the present disclosure may have good linearity in each temperature range regardless of whether the power supply is set to have a positive temperature coefficient or a negative temperature coefficient, and the output voltage curve of the power supply is configured to obtain an output voltage having a predetermined value at a predetermined temperature regardless of whether the temperature range of the output voltage curve and the temperature coefficient in the temperature range are set.

Figure 11:
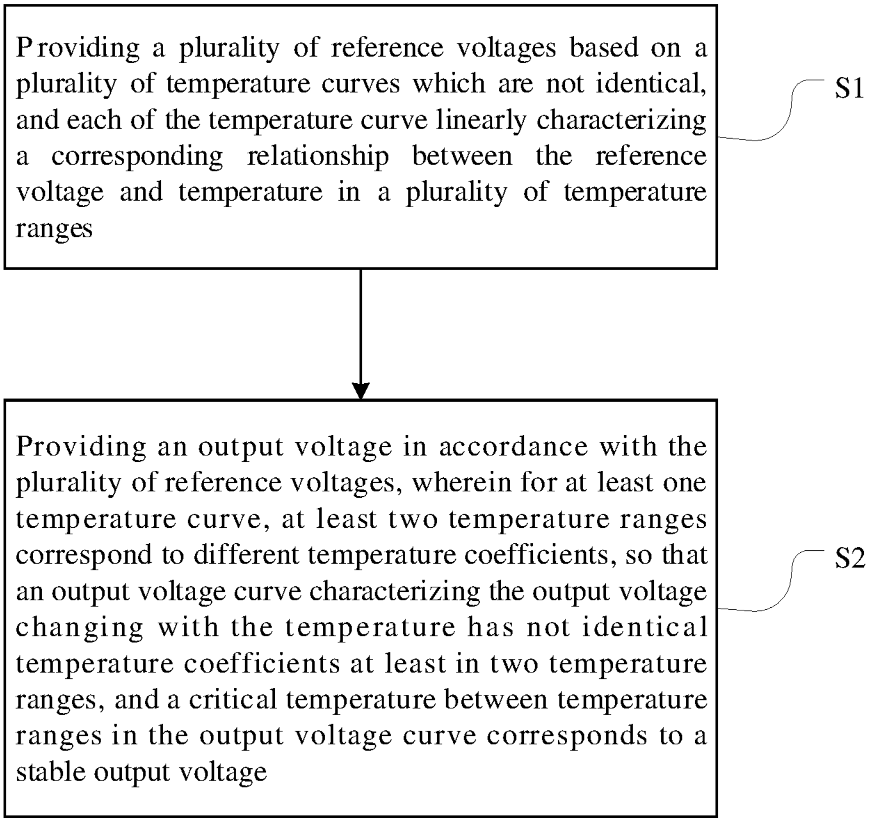
FIG. 11 shows a flowchart of a method for voltage compensation according to an embodiment of the present disclosure.

FIG. 11 shows a flowchart of a method for voltage compensation according to an embodiment of the present disclosure. The flow chart shown in FIG. 11 is merely an example, which should not unduly limit range of the claims. One of ordinary skill in the art would recognize many variations, alternatives, and modifications. For example, various steps shown in FIG. 11 may be added, removed, replaced, rearranged, and repeated.

As shown in FIG. 11, the present disclosure further provides a method for voltage compensation, which specifically includes steps S1 to S2.

In step S1, providing a plurality of reference voltages respectively based on a plurality of temperature curves which are not identical, and each of the temperature curve linearly characterizing a corresponding relationship between the reference voltage and temperature in a plurality of temperature ranges respectively. Optionally, a step of providing a plurality of reference voltages including: providing a first sub-voltage based on a first sub-temperature curve in a first temperature range; providing a second sub-voltage based on a second sub-temperature curve in a second temperature range, wherein the temperature curve comprises a part of the first sub-temperature curve in the first temperature range and a part of the second sub-temperature curve in the second temperature range, a temperature coefficient of the first sub-temperature curve and a temperature coefficient of the second sub-temperature curve are different, and the first sub-temperature curve and the second sub-temperature curve intersect at the critical temperature between the first temperature range and the second temperature range. Optionally, the first sub-temperature curve and/or the second sub-temperature curve having a negative temperature coefficient, a positive temperature coefficient or a zero temperature coefficient.

In step S2, providing an output voltage in accordance with the plurality of reference voltages, wherein for at least one temperature curve, at least two temperature ranges correspond to different temperature coefficients, so that an output voltage curve characterizing the output voltage changing with temperature has not identical temperature coefficients at 1 east in two temperature ranges, and a critical temperature between temperature ranges in the output voltage curve corresponds to a stable output voltage. The output voltage has a linear relationship with the temperature in each of the temperature range, and a difference between temperature coefficients of the output voltage curve in two adjacent temperature ranges is in a predetermined range.

Optionally, providing the output voltage in accordance with the plurality of reference voltages including: summing the plurality of reference voltages and a voltage reference to obtain the output voltage, wherein the output voltage has a predetermined value at a predetermined temperature by configuring a value of the voltage reference. A temperature coefficient of the output voltage curve in each of the temperature range is a sum of temperature coefficients of the plurality of temperature curves in the temperature range.

In summary, the embodiments of the present disclosure provide the power supply, the method for voltage compensation and the electronic device of the present disclosure acquire the output voltage by using the reference voltages with temperature curves which are not identical, so that the output voltage curve characterizing the change of the output voltage with temperature having different temperature coefficients in each temperature range, and the critical temperature between the temperature ranges in the output voltage curve corresponds to a stable output voltage. Therefore, accurate output voltage is capable of being provided in each temperature range, and no step occurs in the output voltage, which improves a stability of the output voltage.

It is noted that, herein, relational terms such as first and second, and the like may be used solely to distinguish one entity or action from another entity or action without necessarily requiring or implying any actual such relationship or order between such entities or actions. Also, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Without further limitation, an element defined by the phrase "comprising an . . . . . ." does not exclude the presence of other identical elements in a process, method, article, or apparatus that comprises the element.

While embodiments in accordance with the invention have been described above, these embodiments are not intended to be exhaustive or to limit the invention to the precise embodiments described. Obviously, many modifications and variations are possible in light of the above teaching. The embodiments were chosen and described in order to best explain the principles of the invention and the practical application, to thereby enable others skilled in the art to best utilize the invention and various embodiments with various modifications as are suited to the particular use contemplated. The invention is limited only by the claims and their full scope and equivalents.

What is claimed is:

1. A power supply, comprising:

a plurality of temperature compensation modules, for providing a plurality of reference voltages respectively based on a plurality of temperature curves which are not identical, and each of the temperature curve linearly characterizing a corresponding relationship between the reference voltage and temperature in a plurality of temperature ranges respectively; and a summation module, for providing an output voltage in accordance with the plurality of reference voltages, wherein for at least one temperature curve, at least two temperature ranges correspond to different temperature coefficients, so that an output voltage curve characterizing the output voltage changing with temperature has not identical temperature coefficients at least in two temperature ranges, and a critical temperature between temperature ranges in the output voltage curve corresponds to a stable output voltage.

2. The power supply according to claim 1, wherein at least one of the plurality of temperature compensation modules comprising:

a first unit, for providing a first sub-voltage based on a first sub-temperature curve;

a second unit, for providing a second sub-voltage based on a second sub-temperature curve; and an output unit, for choosing the first sub-voltage as the reference voltage in a first temperature range and choosing the second sub-voltage as the reference voltage in a second temperature range, wherein the temperature curve comprises a part of the first sub-temperature curve in the first temperature range and a part of the second sub-temperature curve in the second temperature range, a temperature coefficient of the first sub-temperature curve and a temperature coefficient of the second sub-temperature curve are different, and the first sub-temperature curve and the second sub-temperature curve intersect at the critical temperature between the first temperature range and the second temperature range.

3. The power supply according to claim 2, wherein the first unit and/or the second unit comprising:

a first current source, a first resistor and a second resistor connected in series successively between a positive voltage potential and a reference ground potential, a negative temperature coefficient current source connected between the positive voltage potential and a first parallel node, and a second current source connected between the positive voltage potential and the first parallel node, wherein a first output node is located between the first current source and the first resistor to provide a sub-temperature curve of a negative temperature coefficient; or a third current source, a third resistor and a fourth resistor connected in series successively between a positive voltage potential and a reference ground potential, a negative temperature coefficient current source connected between the reference ground potential and a second parallel node, and a fourth current source connected between the positive voltage potential and the second parallel node, wherein a second output node is located between the third current source and the third resistor to provide a sub-temperature curve of a positive temperature coefficient; or a fifth current source and a fifth resistance connected in series successively between a positive voltage potential and a reference ground potential, wherein a third output node is located between the fifth current source and the fifth resistance to provide a sub-temperature curve of a zero temperature coefficient.

4. The power supply according to claim 2, wherein the summation module sums the plurality of reference voltages and a voltage reference to obtain the output voltage, wherein the output voltage has a predetermined value at a predetermined temperature by configuring a value of the voltage reference.

5. The power supply according to claim 1, wherein the summation module sums the plurality of reference voltages and a voltage reference to obtain the output voltage, wherein the output voltage has a predetermined value at a predetermined temperature by configuring a value of the voltage reference.

6. An electronic device, comprising the power supply according to claim 1 for providing the output voltage.

7. The electronic device according to claim 6, wherein further comprising:

a semiconductor device for operating based on the output voltage; and a regulating module for adjusting the output voltage curve of the power supply based on a temperature characteristic of the semiconductor device.

8. A method for voltage compensation, comprising:

providing a plurality of reference voltages respectively based on a plurality of temperature curves which are not identical, and each of the temperature curve linearly characterizing a corresponding relationship between the reference voltage and temperature in a plurality of temperature ranges respectively; and providing an output voltage in accordance with the plurality of reference voltages, wherein for at least one temperature curve, at least two temperature ranges correspond to different temperature coefficients, so that an output voltage curve characterizing the output voltage changing with temperature has not identical temperature coefficients at least in two temperature ranges, and a critical temperature between temperature ranges in the output voltage curve corresponds to a stable output voltage.

9. The method according to claim 8, wherein a step of providing a plurality of reference voltages comprising:

providing a first sub-voltage based on a first sub-temperature curve in a first temperature range; and providing a second sub-voltage based on a second sub-temperature curve in a second temperature range, wherein the temperature curve comprises a part of the first sub-temperature curve in the first temperature range and a part of the second sub-temperature curve in the second temperature range, a temperature coefficient of the first sub-temperature curve and a temperature coefficient of the second sub-temperature curve are different, and the first sub-temperature curve and the second sub-temperature curve intersect at the critical temperature between the first temperature range and the second temperature range.

10. The method according to claim 9, wherein the first sub-temperature curve and/or the second sub-temperature curve having a negative temperature coefficient, a positive temperature coefficient or a zero temperature coefficient.

11. The method according to claim 10, wherein the output voltage has a linear relationship with the temperature in each of the temperature range, and a difference between temperature coefficients of the output voltage curve in two adjacent temperature ranges is in a predetermined range.

12. The method according to claim 9, wherein providing the output voltage in accordance with the plurality of reference voltages comprising: summing the plurality of reference voltages and a voltage reference to obtain the output voltage, wherein the output voltage has a predetermined value at a predetermined temperature by configuring a value of the voltage reference.

13. The method according to claim 8, wherein providing the output voltage in accordance with the plurality of reference voltages comprising: summing the plurality of reference voltages and a voltage reference to obtain the output voltage, wherein the output voltage has a predetermined value at a predetermined temperature by configuring a value of the voltage reference.

14. The method according to claim 8, wherein a temperature coefficient of the output voltage curve in each of the temperature range is a sum of temperature coefficients of the plurality of temperature curves in the temperature range.

* * * * *